Figure 8:
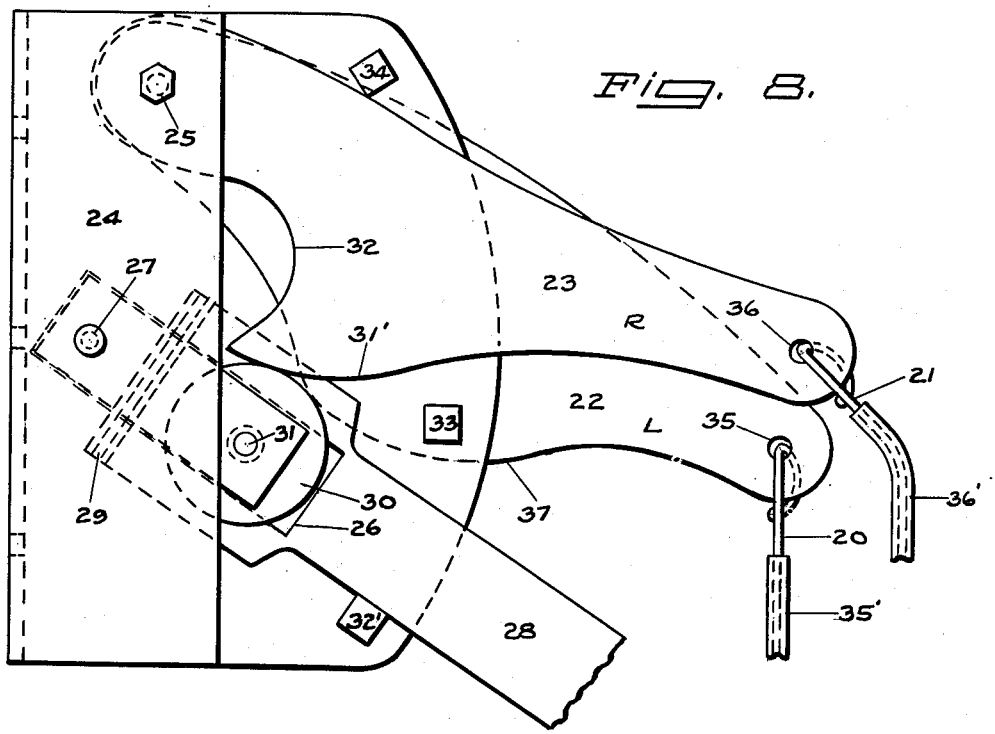

Jan. 20, 1953 K. B. GLASS 2,625,900
AUTOMOBILE TRUCK DIRECTION INDICATOR
Filed July 23, 1949 3 Sheets-Sheet 1
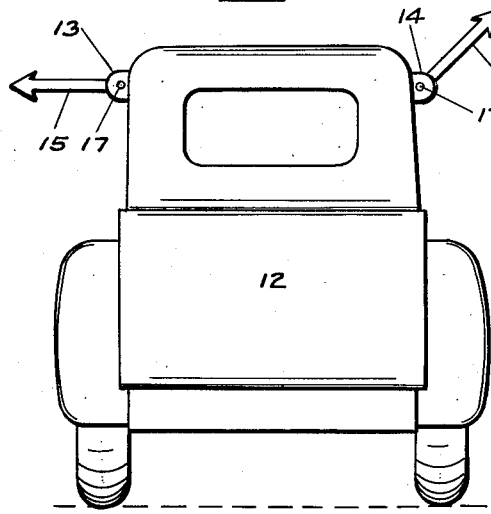
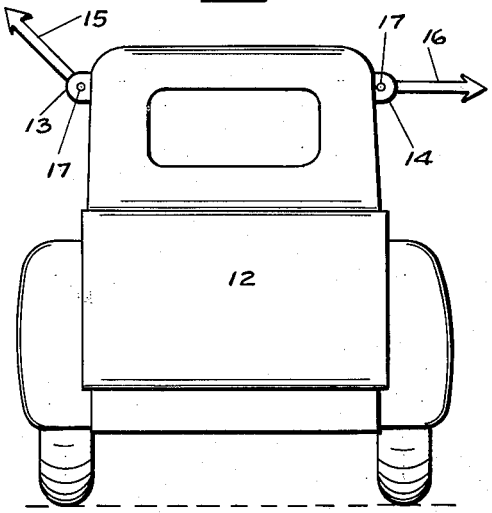
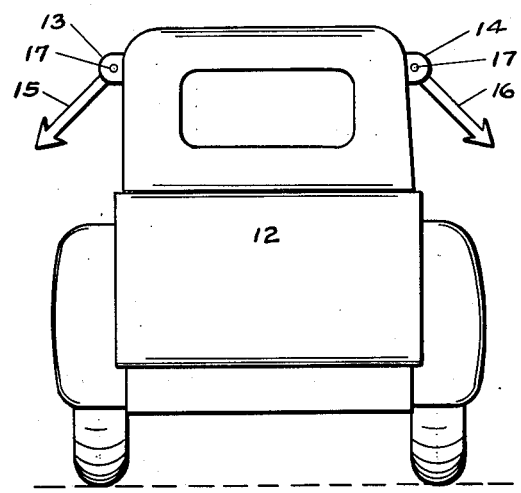
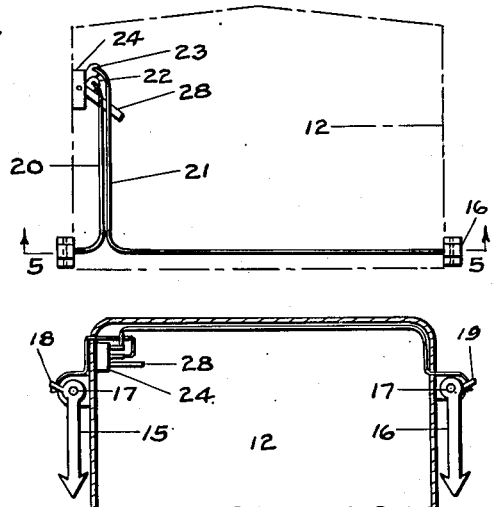
INVENTOR.
KARL B. GLASS
BY Edward C Healy
ATTORNEY Jan. 20, 1953  K. B. GLASS  2,625,900
AUTOMOBILE TRUCK DIRECTION INDICATOR
Filed July 23, 1949  3 Sheets-Sheet 2
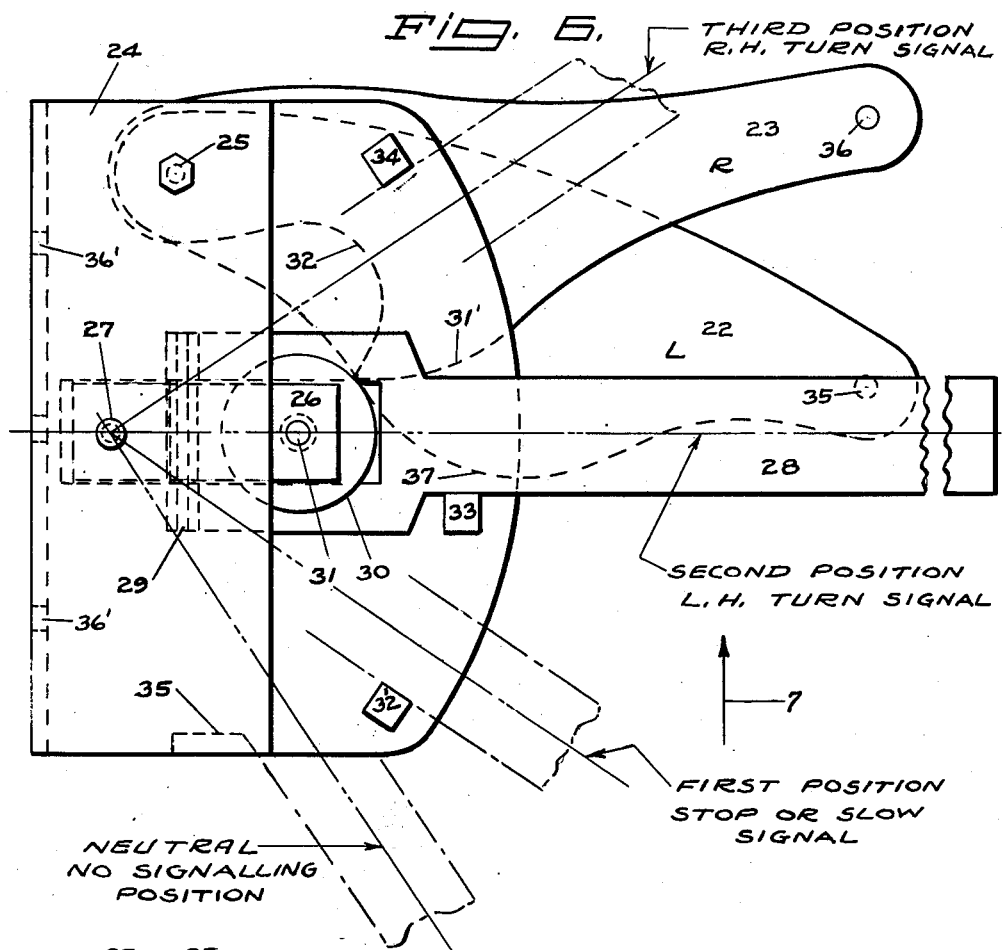
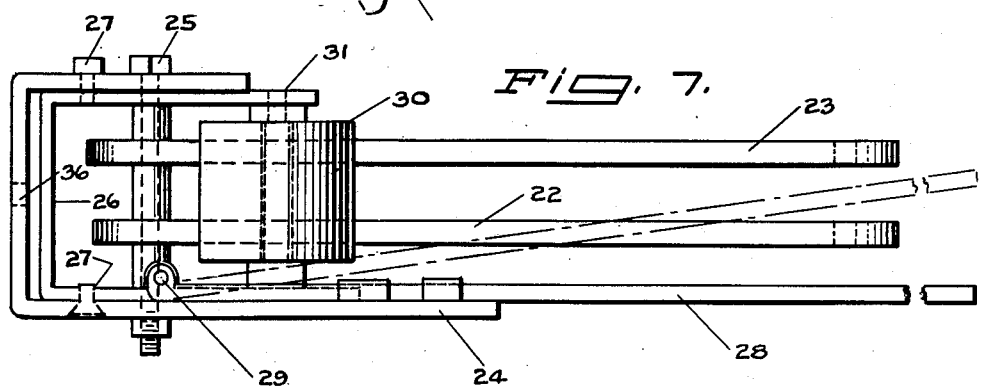
INVENTOR.
KARL B. GLASS
BY Edward C Healy
ATTORNEY Jan. 20, 1953 K. B. GLASS 2,625,900
AUTOMOBILE TRUCK DIRECTION INDICATOR
Filed July 23, 1949 3 Sheets-Sheet 3

INVENTOR.
KARL B. GLASS
BY
Edward C Healy
ATTORNEY

Patented Jan. 20, 1953

2,625,900

UNITED STATES PATENT OFFICE 2,625,900

AUTOMOBILE TRUCK DIRECTION INDICATOR

Karl B. Glass, Paso Robles, Calif.

Application July 23, 1949, Serial No. 106,418

1 Claim. (Cl. 116—52)

This invention relates to an improved automobile and truck direction signalling device and has for the primary object the provision of a pair of oppositely opposed signalling arms, one of which is positioned on each side of the truck, whereby drivers of other automobiles either following the truck or driving toward the same can see at a glance the signalling of the driver for indicating a slowing down or stopping intention or which direction the vehicle is about to turn.

It is very difficult at many times for a driver of an automobile, particularly when driving in the rear of a large truck, to see the signal on the left side of that truck, the position of the automobile being such the driver can see the right hand side of the truck only and has no way of knowing the intentions of the truck driver. It will be obvious, for example, if the truck driver signals a turning to the right and turns the truck accordingly a great hazard is involved and thus many serious accidents caused.

It is an object of the present invention to eliminate such accident hazards by mounting a direction indicating signal on each side of the truck and to provide a mechanism within the truck for automatically controlling both signals simultaneously.

Another object of the present invention is to form the said mechanism of a pair of lever arms and connect one arm to each signal indicator and to control the said lever arms by a pivotally secured manually operative handle upon which a cylindrical member is vertically positioned and revolvably mounted, which cylindrical member engages the said lever arms and changes the positions of the same, whereby the signal indicators are moved to their correct signalling positions.

A further object of the present invention is the provision of an automobile and truck direction signalling indicator of the character described that is durable, simple in construction, positive in operation, economical to manufacture and highly efficient and serviceable in use.

Other objects and advantages will be apparent during the course of the following description.

In the accompanying drawings forming a part of the specification, wherein for the purpose of illustration like numerals designate like parts throughout the same, Fig. 1 is a rear elevational view of a truck, disclosing the oppositely opposed signal indicators on each side of the truck and showing the indicators in their "slowing down" or "stop" positions, Fig. 2 is a view of the truck similar to Fig. 1 and showing the indicators in their "left turn" positions, Fig. 3 is a view showing the indicators in their "right turn" positions, Fig. 4 is a diagrammatic view showing the control mechanism mounted in the truck and the connecting cables leading from the levers to the signal indicators, Fig. 5 is a horizontal sectional view taken through line 5—5 of Fig. 4, looking in direction of the arrows, Fig. 6 is a plan view of the control mechanism showing the relative positions of the control lever arms when signalling a "left hand turn,"

Figure 9:
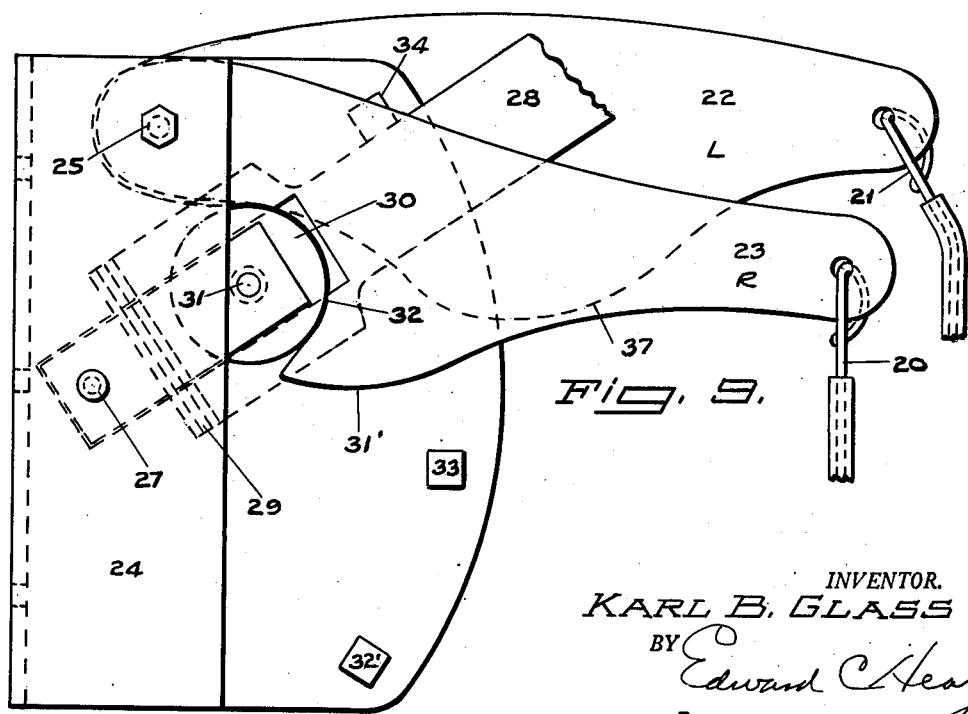

Fig. 7 is a vertical elevational view of Fig. 6, looking in direction of the arrow 7, Fig. 8 is a plan view of the control mechanism showing the relative positions of the control lever arms when giving the "slowing down" or "stop" signal, and Fig. 9 is a plan view of the control mechanism showing the relative positions of the control lever arms when giving the "right turn" signal.

Referring in detail to the drawings and the numerals thereof, the numeral 12 designates an ordinary truck and the numerals 13 and 14 a pair of substantially U-shaped brackets secured to the side portions thereof in any suitable manner. The numerals 15 and 16 designate two signalling indicators, preferably in the form of arrows, but can be made in any other suitable form and are pivotally secured to their respective brackets by suitable pins 17, disclosed to advantage in Figs. 1, 4 and 5. The said signalling indicators are provided with fixed angular extending straps 18 and 19, respectively, and suitable cables 20 and 21, respectively, lead from the said straps to the control mechanism lever arms 22 and 23, respectively.

Any suitable mechanism can be provided for controlling the signalling indicators, the present illustration showing two lever arms 22 and 23 pivotally connected to a channel shaped bracket 24, as at 25, and positioned one above the other as disclosed to advantage in Figs. 6 and 7. A channel shaped strap 26 is provided within the bracket and pivoted to the top and bottom portions thereof as at 27. A bifurcated handle 28 is horizontally hinged to the said strap as at 29 and a cylindrical member 30 is vertically positioned thereon and pivoted thereto as at 31, disclosed to advantage in Figs. 6 and 7. Three stop members 32', 33 and 34 define the different positions of the handle for controlling the signals and a stop member 35 defines the neutral position. The outer end portions of the control lever arms 22 and 23 are apertured as at 36 and 37, respectively, for receiving the ends of the cables 20 and 21, respectively, as disclosed to advantage in Figs. 8 and 9, whereby the indicators are connected to the control mechanism, the lever 22 controlling the left hand signal and the lever 23 controlling the right hand signal.

It will be noted the left signal control lever 22 is formed with a cam portion 38 which engages the cylindrical member 30 and the right signal control lever is formed with a cam portion 31 and a curved recess 32, both of which engage the cylindrical member 30. This construction changes the position of the levers when the cylindrical member 30 is moved to the different positions as shown in Figs. 6, 8 and 9. The stops 32', 33 and 34 define the positions of the control lever arms 22 and 23 when the handle 28 is moved against the same as illustrated in Figs. 6, 8 and 9, the stop 32' defining the stop or slowing down position, the stop 33, the left turn position and the stop 34 the right turn position. The location of the said stops are such as cause the control levers to be spaced from the signal indicators to pull the same to their proper signalling positions. The cable is preferably slidably mounted through a copper tubing 39 to properly support the same. The bracket 24 has a plurality of holes 40 for accommodating suitable screws for fastening the same to the side wall within the cab of the truck. The side walls are apertured for enabling the cable tubing to pass through the same.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A directional signalling device for automotive vehicles, comprising a bracket fixed to the right wall of the vehicle on the outer surface thereof and a second bracket fixed to the left wall of the vehicle on the outer surface thereof, a signalling arm pivotally secured to each bracket, a manually operative mechanism for controlling each signalling arm, said mechanism embodying in its construction a channel shaped bracket capable of being positioned within the cab of the vehicle and fixed to a wall thereof, two levers spaced one from the other and pivotally secured to the said channel bracket, a pair of cables one of which is connected to the free end portion of each of the said levers and leads therefrom and is connected to one of the signalling arms, a cam provided on each lever, a handle pivotally secured to each lever, and an oscillative cylindrical member mounted on said handle and adapted to engage the cam portions on each lever, whereby the outer end portions of the levers are moved different distances apart for operating the signalling arms when rotary movement is imparted to the handle, and a plurality of stop members carried by the plate for limiting the movement of the levers to define the different respective positions of the signalling arms.

KARL B. GLASS.

REFERENCES CITED

The following references are of record in the file of this patent:

UNITED STATES PATENTS

| Number | Name | Date |
|---|---|---|
| 1,192,780 | Hebern | July 25, 1916 |
| 1,336,713 | Bahler | Apr. 13, 1920 |
| 1,373,738 | Jaszewski | Apr. 5, 1921 |